United States Patent
Saadani et al.

(10) Patent No.: US 9,531,461 B2
(45) Date of Patent: Dec. 27, 2016

(54) METHOD OF GROUPING TRANSMITTER-RECEIVER PAIRS FOR COMMUNICATING OVER A COMMUNICATIONS NETWORK

(71) Applicant: ORANGE, Paris (FR)

(72) Inventors: Ahmed Saadani, Issy les Moulineaux (FR); Slim Ben Halima, Issy les Moulineaux (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/365,003

(22) PCT Filed: Dec. 19, 2012

(86) PCT No.: PCT/FR2012/052996
§ 371 (c)(1),
(2) Date: Jun. 12, 2014

(87) PCT Pub. No.: WO2013/093341
PCT Pub. Date: Jun. 27, 2013

(65) Prior Publication Data
US 2014/0348256 A1    Nov. 27, 2014

(30) Foreign Application Priority Data

Dec. 23, 2011    (FR) ..................................... 11 62396

(51) Int. Cl.
*H04B 7/04*    (2006.01)
*H04W 72/08*    (2009.01)
*H04W 72/12*    (2009.01)

(52) U.S. Cl.
CPC ........... *H04B 7/046* (2013.01); *H04W 72/121* (2013.01); *H04W 72/082* (2013.01); *H04W 72/12* (2013.01)

(58) Field of Classification Search
CPC .................................. H04B 7/04; H04L 25/03
See application file for complete search history.

(56) References Cited

U.S. PATENT DOCUMENTS 6,278,686 B1    8/2001    Alard
6,584,068 B1    6/2003    Alard
(Continued)

FOREIGN PATENT DOCUMENTS

FR    2733869 A1    11/1996
FR    2930094 A1    10/2009
(Continued)

OTHER PUBLICATIONS

U.S. Appl. No. 14/364,971, filed Jun. 12, 2014, Siohan et al.
(Continued)

*Primary Examiner* — Jaison Joseph
(74) *Attorney, Agent, or Firm* — Knobbe Martens Olson & Bear LLP

(57) ABSTRACT

Disclosed is a method of grouping transmitter-receiver pairs for communicating over a communications network. For each group of a set of groups of transmitter-receiver pairs, the pairs of the group execute an iterative interference alignment technique for I1 iterations on signals transmitted by the group. Each transmitter of the group successively sends a pilot signal that has been precoded by a matrix resulting from that execution. Each receiver of the group evaluates a metric representative of a distance between a vector subspace generated by the pilot signal transmitted by the transmitter with which it forms a pair and a vector subspace generated by interferences determined from the pilot signals transmitted by the other transmitters. A central unit calculates a global metric associated for each group on the basis of the metrics from the receivers of the group and selects from the set a group that optimizes the global metric.

13 Claims, 5 Drawing Sheets

(56) References Cited

U.S. PATENT DOCUMENTS

| | | | |
|---|---|---|---|
| 7,724,835 B2 | 5/2010 | Naguib | |
| 7,769,097 B2 | 8/2010 | Sandhu | |
| 8,036,098 B2* | 10/2011 | Pereira | H04W 28/0231 370/201 |
| 9,118,365 B2 | 8/2015 | Phan Huy | |
| 2003/0021257 A1* | 1/2003 | Sato et al. | 370/347 |
| 2003/0095533 A1 | 5/2003 | Joo et al. | |
| 2004/0013211 A1 | 1/2004 | Lindskog | |
| 2004/0022183 A1 | 2/2004 | Li et al. | |
| 2004/0120274 A1 | 6/2004 | Petre et al. | |
| 2004/0196919 A1 | 10/2004 | Mehta et al. | |
| 2005/0152473 A1 | 7/2005 | Maltsev et al. | |
| 2005/0157682 A1 | 7/2005 | Sandhu | |
| 2005/0185575 A1 | 8/2005 | Hansen et al. | |
| 2008/0159423 A1 | 7/2008 | Omoto et al. | |
| 2008/0247482 A1 | 10/2008 | Mege et al. | |
| 2008/0260061 A1 | 10/2008 | Javaudin et al. | |
| 2009/0213949 A1 | 8/2009 | Javaudin | |
| 2009/0316569 A1 | 12/2009 | Lele et al. | |
| 2010/0027410 A1 | 2/2010 | Sandhu | |
| 2010/0226293 A1* | 9/2010 | Kim | H04B 15/02 370/280 |
| 2010/0227566 A1* | 9/2010 | Kim | H04B 7/0617 455/67.13 |
| 2010/0227613 A1* | 9/2010 | Kim et al. | 455/434 |
| 2010/0265813 A1 | 10/2010 | Pereira et al. | |
| 2011/0002408 A1 | 1/2011 | Javaudin | |
| 2011/0028101 A1 | 2/2011 | Phan Huy et al. | |
| 2011/0103457 A1 | 5/2011 | Phan Huy et al. | |
| 2011/0110458 A1 | 5/2011 | Siohan et al. | |
| 2011/0194551 A1 | 8/2011 | Lee et al. | |
| 2012/0008577 A1 | 1/2012 | Han et al. | |
| 2012/0014329 A1 | 1/2012 | Kwon et al. | |
| 2012/0099493 A1 | 4/2012 | Phan Huy et al. | |
| 2012/0127953 A1 | 5/2012 | Kawamura et al. | |
| 2012/0243625 A1 | 9/2012 | Berg | |
| 2012/0281780 A1* | 11/2012 | Huang | H04B 7/0452 375/267 |
| 2012/0307926 A1* | 12/2012 | Kuo | H04B 7/0617 375/267 |
| 2013/0286959 A1 | 10/2013 | Lou et al. | |
| 2014/0348252 A1 | 11/2014 | Shiohan et al. | |
| 2015/0124897 A1 | 5/2015 | Phan Huy et al. | |

FOREIGN PATENT DOCUMENTS

| | | |
|---|---|---|
| GB | 2463508 A | 3/2010 |
| WO | WO 2009/048256 A1 | 4/2009 |
| WO | WO 2009/156703 A2 | 12/2009 |
| WO | WO 2010/128234 A1 | 11/2010 |
| WO | WO 2011/033217 A1 | 3/2011 |
| WO | WO 2013/093274 A1 | 6/2013 |
| WO | WO 2013/093340 A2 | 6/2013 |

OTHER PUBLICATIONS

U.S. Appl. No. 14/365,038, filed Jun. 12, 2014, Phan Huy.
Alamouti, Siavash M., "A Simple Transmit Diversity Technique for Wireless Communications", IEEE J Select Areas Comm. (Oct. 1998) 16(8):1451-1458.
Gomadam et al. "Approaching the capacity of wireless networks through distributed interference alignment", IEEE Global Telecommunications Conference GLOBECOM, Dec. 2008.
Kumar et al. "An iterative algorithm for joint signal and interference alignment", IEEE International Symposium on Information Theory Proceedings (ISIT), (Jun. 2010) pp. 2293-2297.
Lélé et al. "Channel estimation methods for preamble-based OFDM/OQAM modulations", European Wireless, Apr. 2007, 7 pages.
Negro et al., "Interference Alignment Limits for K-User Frequency-flat Mimo Interference Channels", 17th European Signal Processing Conference (EUSIPCO 2009), Glasgow, Scotland, Aug. 24-28, 2009; pp. 2445-2449.
Nguyen, Hung Tuan, "On the performance of one bit time reversal for multi-user wireless communications", 4th International Symposium on Wireless Communication Systems, IEEE, Piscataway, NJ, USA (Oct. 2007), pp. 672-676.
Tarokh et al., "Space-Time Block Codes from Orthogonal Designs", IEEE Trans Inform Theory (Jul. 1999) 45(5):1456-1467.
Wang et al., "Full Rate Orthogonal Space-Time Block Coding in OFDM Transmission Using Time Reversal", IEEE Wireless Communications and Networking Conference, IEEE, Piscataway, NJ, USA (Apr. 2009), pp. 1-6.
Zuccon et al. "Semantic spaces: measuring the distance between different subspaces", Proceedings of the 3rd International Symposium on Quantum Interaction, 2009; pp. 225-236.
International Search Report mailed Sep. 4, 2013 for Application No. PCT/FR2012/052995, filed Dec. 19, 2012.
International Search Report mailed Oct. 29, 2013 for Application No. PCT/FR2012/052996, filed Dec. 19, 2012.
International Search Report mailed Feb. 26, 2013 for Application No. PCT/FR2012/052762, filed Nov. 30, 2012.
U.S. Office Action dated Mar. 5, 2015 in co-pending U.S. Appl. No. 14/365,038.
U.S. Office Action dated Nov. 3, 2015 in co-pending U.S. Appl. No. 14/364,971.
Applicant Response to Office Action filed May 13, 2015 in co-pending U.S. Appl. No. 14/365,039.
U.S. Notice of Allowance dated Jun. 10, 2015 in co-pending U.S. Appl. No. 14/365,039.
Issue Fee Payment on Jul. 17, 2015 in co-pending U.S. Appl. No. 14/365,039.
Applicant Comments on Statement of Reasons for Allowance in co-pending U.S. Appl. No. 14/365,039.
U.S. Office Action dated May 1, 2015 in co-pending U.S. Appl. No. 14/364,971.
Applicant Response to Office Action filed Jul. 29, 2015 in co-pending U.S. Appl. No. 14/364,972.
U.S. Response dated Dec. 21, 2015 in co-pending U.S. Appl. No. 14/364,971.
U.S. Office Action [Ex Parte Quayle] dated Apr. 21, 2016 in co-pending U.S. Appl. No. 14/364,971.
Applicant Response to Ex Parte Quayle Action dated Jun. 20, 2016 in co-pending U.S. Appl. No. 14/364,971.
Applicant Initiated Interview Summary dated Jun. 23, 2016 in co-pending U.S. Appl. No. 14/364,971.
U.S. Notice of Allowance dated Jul. 6, 2016 in co-pending U.S. Appl. No. 14/364,971.

* cited by examiner

METHOD OF GROUPING TRANSMITTER-RECEIVER PAIRS FOR COMMUNICATING OVER A COMMUNICATIONS NETWORK

RELATED APPLICATIONS

This application is the U.S. National Phase of Application No. PCT/FR2012/052996 entitled "METHOD FOR FORMING GROUPS OF TRANSMITTER/RECEIVER PAIRS FOR COMMUNICATING OVER A COMMUNICATION NETWORK" filed Dec. 19, 2012, which designated the United States, and which claims the benefit of French Application No. 1162396 Dec. 23, 2011.

BACKGROUND OF THE INVENTION

The invention relates to the general field of communications.

The invention relates more particularly to a method of designating a group of transmitter-receiver pairs authorized to communicate simultaneously over a telecommunications network when interference alignment techniques are implemented on the network in order to manage the multiuser interference that is generated by such simultaneous communications. Such a method is also known as a clustering (or grouping) method.

A preferred but non-limiting application of the invention lies in the field of wireless networks, such as for example wireless fidelity (WiFi®) networks in which a plurality of access points may be deployed to serve a plurality of users, or mobile networks using femtocells, as defined by the third generation partnership project (3GPP) standard.

In known manner, a major problem encountered in networks in which a plurality of transmitter-receiver pairs may be communicating simultaneously lies in the interference these transmitter-receiver pairs generate between one another.

Various techniques have been proposed to manage such interference.

In such techniques, so-called interference alignment techniques (or algorithms) consist:
  firstly in confining the interference seen by a particular receiver in a vector subspace of small dimension, by applying a precoding matrix to the useful signal at the transmitter paired with the receiver; and
  secondly in using the remaining dimensions for decoding the useful signal by projecting it onto a vector subspace orthogonal to the vector subspace associated with the interference.

In systems comprising a plurality of transmitter-receiver pairs respectively having multiple transmit antennas and multiple receive antennas (also known as multiple-input multiple-output (MIMO) systems), such interference alignment techniques also make use of the space dimension made available by the multiple transmit and receive antennas in order to achieve alignment of interference.

For MIMO systems, there exist in particular interference alignment techniques that are iterative. Such techniques present the advantage of not requiring overall knowledge at each transmitter about the propagation channels associated with all of the transmitter-receiver pairs participating in the interference alignment. More precisely, they make use of signal precoding at the transmitter (e.g. a device A) and elimination of interference at the receiver (e.g. a device B) by using filters, which filters are updated on each iteration by alternating between transmitting over the direct network (transmission from A to B) and transmitting over the dual network (transmission form B to A). For this purpose, certain iterative techniques rely in particular on channel reciprocity between the direct network and the dual network.

In general manner, the feasibility of interference alignment depends on parameters of the system under consideration. Thus, for a MIMO system, the feasibility of interference alignment depends in particular on the number of transmitter-receiver pairs attempting to communicate simultaneously, on the number of transmit antennas and the number of receive antennas of the transmitter-receiver pairs (which numbers are not necessarily identical for each of the pairs), and on the number of parallel data streams exchanged between each transmitter-receiver pair. In other words, depending on the parameters of the system, interference alignment may be achieved for only a limited number $NG \leq NGmax$ of transmitter-receiver pairs that are communicating simultaneously.

Given this constraint, it is possible to implement grouping methods in order to designate a group of NG transmitter-receiver pairs suitable for communicating simultaneously over the network and for executing an interference alignment technique effectively (i.e. for achieving interference alignment).

By way of example, the NG transmitter-receiver pairs making up the group may be designed randomly. Nevertheless, it will readily be understood that even though opting for grouping in this way does not add complexity to the system, it does not enable system performance to be guaranteed, in particular in terms of data rate.

In the present state of the art there exist alternative grouping methods that enable the data rate achieved by the system to be improved and that consist in selecting a group of transmitter-receiver pairs that satisfy determined criteria. One such method is described in particular in Document U.S. Pat. No. 8,036,098.

That method, shown diagrammatically in FIG. 1, sets a minimum target data rate R to be achieved and a group size NG enabling interference alignment to be performed (step E10).

Furthermore, during a first stage I, transmitter-receiver pairs are identified for which the matrices of the direct channels present singular values that exceed a predetermined threshold T (step E20). The NG transmitter-receiver pairs having the greatest singular values are then selected to form a group in order to align interference (step E30). The total data rate made available by the NG selected pairs is calculated (step E40) and compared with the target data rate R (step E50).

If the total data rate exceeds the target data rate R (response yes to the test of step E50), the group of NG selected pairs is validated and it executes an interference alignment technique (step E90).

Otherwise, in contrast, a second stage II begins of searching for a new group.

During this second stage II, a group of NG+c transmitter-receiver pairs is selected randomly (step E60). Thereafter, for each possible subgroup of NG transmitter-receiver pairs selected from this group, the total data rate that can be achieved is evaluated while taking account of an application of a non-iterative interference alignment technique that requires knowledge about the propagation channel at the transmitter (step E70). The subgroup of NG pairs corresponding to the greatest total data rate is selected (step E80) in order to execute the interference alignment algorithm (step E90).

Nevertheless, although such a method does indeed make it possible to improve the data rate that is achieved by the system, it does not take account of the total spectrum efficiency of the system.

It may also present a large amount of complexity when the exhaustive search stage II is performed, in particular because of repeated execution of the interference alignment technique and because of the information required for such execution (e.g. global knowledge of the propagation channel at each transmitter). Such complexity increases even further when consideration is given to an iterative interference alignment technique, since that generally requires a large number of iterations in order to converge.

One of the objects of the invention is to remedy the insufficiencies of grouping methods in the state of the art.

OBJECT AND SUMMARY OF THE INVENTION

Thus, in a first aspect, the invention provides a method of grouping a predetermined number NG of transmitter-receiver pairs for communicating over a communications network, the method comprising:

for each group of a determined set of groups comprising NG transmitter-receiver pairs:
  an execution step in which the NG pairs of the group execute an iterative interference alignment technique for a predetermined number I1 of iterations on the signals transmitted by the group;
  a sending step in which each transmitter of the NG pairs of the group sends a pilot signal precoded with the help of a matrix resulting from executing said iterative interference alignment technique, the transmitters of the NG pairs of the group successively transmitting the pilot signals; and
  an evaluation step in which each receiver of the NG pairs of the group evaluate a metric representative of a distance between a vector subspace generated by the precoded pilot signal transmitted by the transmitter with which the receiver forms a transmitter-receiver pair and a vector subspace generated by the interferences affecting the precoded pilot signal as determined from the precoded pilot signals transmitted by the other transmitters of the group;
a calculation step in which a central unit of the network calculates a global metric associated with each group of the determined set of groups on the basis of the metrics evaluated by the receivers of the NG pairs of the group; and
a selection step in which the central unit selects from the determined set of groups a group that optimizes the global metric for communicating over the network.

The invention thus proposes a novel grouping method that uses an iterative interference alignment technique and that makes it possible to select a group of NG transmitter-receiver pairs in a communications network optimizing a global metric calculated from metrics associated with the various transmitter-receiver pairs of the group, each metric associated with a transmitter-receiver pair of the group being representative of a distance between a vector subspace generated by a useful signal and a vector subspace generated by interferences affecting the useful signal at the receiver of the pair, after interference alignment. These metrics are advantageously evaluated by the receivers of a group on the basis of precoded pilot signals sent successively by the transmitters of the group.

The number NG may be any number for which it is possible to align interferences for a group of NG transmitter-receiver pairs. Thus, if NGmax is the maximum number of transmitter-receiver pairs for which interference alignment is possible, then NG is any integer less than or equal to NGmax.

By selecting the group that optimizes a global metric calculated on the basis of metrics associated with the various transmitter-receiver pairs of the group, the selected group is the group that is the most promising from the point of view of distance between the vector subspace generated by the useful signal and the vector subspace generated by the interferences, in other words it is the group that maximizes the spectrum efficiency of the system. The invention thus also improves the total spectrum efficiency of the system. This improvement is associated not only with the criterion taken into consideration for selecting the group, but also with the fact that this criterion relies on a metric evaluated after executing the interference alignment technique for a predetermined number I1 of iterations (I1 greater than or equal to 1).

Executing the interference alignment technique in each group under test, even over a number I1 of iterations that is relatively limited, makes it possible to identify approximately the directions of the interferences and the direction of the useful signal. The estimate of these directions is subsequently improved by processing the precoded pilot signals transmitted successively by the NG transmitters of the group. In accordance with the invention, when any one transmitter of the group transmits a pilot signal, the other transmitters of the group are inactive (i.e. they remain silent), such that it is much easier for the receivers of the group to estimate the directions of the useful signal and of the interferences.

Advantageously, the number I1 of iterations required is less than, possibly much less than, the number of iterations required to ensure that the iterative technique converges (and thus that interferences are aligned). A few iterations only suffice (and possibly only a single iteration).

The invention thus benefits from reduced complexity in spite of using an iterative alignment technique, since only a few iterations suffice at each receiver for evaluating its metric and enabling the central unit to select a group.

In a particular implementation, after the selection step, the pairs of the group selected for communicating over the communications network execute the iterative interference alignment technique on the signals transmitted by the selected group for a number I2 of iterations that is greater than the number I1.

During this execution of the alignment technique, the pairs of the selected group can advantageously reuse as initial values the precoding matrices and the interference suppression matrices as evaluated during the preceding I1 iterations executed by the group. This obtains faster convergence for the interference alignment technique (in other words, I2 is smaller).

In a variant, an interference alignment algorithm other than that used during the I1 iterations of the group test stage can be used by the group selected for communicating over the network.

The grouping method proposed by the invention thus relies on various actors: the transmitter-receiver pairs of the communications system and also a central unit in charge of selecting the group that is to be authorized to communicate over the network and to perform interference alignment. It may be observed that this central unit may be associated with transmission (e.g. at any one of the transmitters or in a transmitter management unit), with reception (e.g. at any one of the receivers or in a receiver management unit), or anywhere in the communications network.

The invention thus also provides a selection method in which a central unit of a communications network selects a group having a predetermined number NG of transmitter-receiver pairs for communicating over the network, the method comprising:

for each group of a determined set of groups comprising NG transmitter-receiver pairs, an obtaining step of obtaining metrics evaluated by the receivers of the NG pairs of the group after execution of an interference alignment technique by the group during a predetermined number I1 of iterations on signals transmitted by the group, and after receiving pilot signals transmitted successively by the transmitters of the NG pairs of the group, the pilot signals being precoded with the help of matrices resulting from executing the iterative interference alignment technique, each metric evaluated by a receiver of said group being representative of a distance between a vector subspace generated by the precoded pilot signal transmitted by the transmitter with which the receiver forms a transmitter-receiver pair, and a vector subspace generated by interferences affecting this precoded pilot signal as determined from the precoded pilot signals transmitted by the other transmitters of the group;

a calculation step of calculating a global metric associated with each group of the determined set of groups on the basis of the metrics evaluated by the receivers of the NG pairs of the group; and a selection step of selecting from the determined set of groups a group that optimizes the global metric for communicating over the network.

Correspondingly, the invention also provides a central unit of a communications network suitable for selecting a group for communicating over the network, the group comprising a predetermined number NG of transmitter-receiver pairs, and the central unit comprising:

means for obtaining metrics for each group of a determined set of groups, each comprising NG transmitter-receiver pairs, the metrics being evaluated by the receivers of the NG pairs of the group after the group has executed an interference alignment technique for a predetermined number I1 of iterations on signals transmitted by the group and after receiving pilot signals transmitted successively by the transmitters of the NG pairs of the group, the pilot signals being precoded with the help of matrices resulting from executing the iterative interference alignment technique, each metric evaluated by a receiver of the group being representative of a distance between a vector subspace generated by the precoded pilot signal transmitted by the transmitter with which the receiver forms a transmitter-receiver pair, and a vector subspace generated by interferences affecting the precoded pilot signal and determined from precoded pilot signals transmitted by the other transmitters of the group;

calculation means for calculating a global metric associated with each group of the determined set of groups on the basis of the metrics evaluated by the receivers of the NG pairs of the group; and selection means for selecting from the determined set of groups a group that optimizes the global metric for communicating over the network.

The selection method and the central unit of the invention have the same advantages as the grouping method of the invention.

By way of example, the global metric associated with a group is equal to the sum of the metrics evaluated by the receivers of the NG pairs of the group. Naturally, in a variant, other global metrics may be envisaged.

In a particular implementation of the invention, the central unit is in charge of scheduling the various steps performed in accordance with the invention, and in particular how communications periods allocated to each transmitter-receiver pair or to each group are distributed (e.g. a period for executing the interference alignment technique by each group under test, a period of sending a pilot signal from a single transmitter, etc.). This organization may be undertaken by sending appropriate commands from the central unit to the actors in question in the network.

In a variant, this scheduling may be predetermined, and applied directly by the transmitter-receiver pairs without receiving particular commands from the central unit.

In a third aspect, the invention also provides an evaluation method for evaluating a metric by a receiver of a communications network, the receiver forming a transmitter-receiver pair with a transmitter of the network, the pair belonging to a group having a predetermined number NG of transmitter-receiver pairs. In accordance with the invention, the evaluation method comprises:

an execution step of executing an iterative interference alignment technique during a predetermined number I1 of iterations on signals transmitted by the group;

a reception step of receiving pilot signals transmitted successively by the transmitters of the NG pairs of said group, which pilot signals are precoded with the help of matrices resulting from executing the iterative interference alignment technique; and an evaluation step of evaluating a metric representative of a distance between a vector subspace generated by the precoded pilot signal transmitted by the transmitter with which the receiver forms a transmitter-receiver pair, and a vector subspace generated by interferences affecting this precoded pilot signal and determined from the precoded pilot signals transmitted by the other transmitters of the group.

Correspondingly, the invention also provides a receiver of a communications network, the receiver forming a transmitter-receiver pair with a transmitter of the network, the pair belonging to a group having NG transmitter-receiver pairs. In accordance with the invention, the receiver comprises:

means for executing an iterative interference alignment technique during a predetermined number I1 of iterations on signals transmitted by the group;

means for receiving pilot signals transmitted successively by the transmitters of the NG pairs of said group and precoded with the help of matrices resulting from executing the iterative interference alignment technique; and means for evaluating a metric representative of a distance between a vector subspace generated by the precoded pilot signal transmitted by the transmitter with which the receiver forms a transmitter-receiver pair, and a vector subspace generated by interferences affecting this precoded pilot signal as determined from precoded pilot signals transmitted by the other transmitters of the group.

The method of evaluating a metric and the receiver of the invention possess the same advantages as the grouping method of the invention.

In a particular implementation, the method of evaluating a metric further comprises a step of transmitting the metric to the transmitter with which the receiver forms a pair or to a central unit of the communications network.

Thus, the invention adapts to the architecture of the communications network, depending on whether the receiver communicates directly with the central unit or via the transmitter with which it is paired.

In another implementation, the metric that is evaluated is representative of a chord distance between the two subspaces.

In a particular implementation in which the receiver has MR receive antennas, the subspace generated by the interferences under consideration for evaluating the metric is the vector subspace generated by the MR-1 strongest interferences.

In this implementation, the invention thus makes use of the multiple receive antennas present at a receiver for defining the vector subspace generated by the interferences taken into consideration in the metric.

In a particular implementation, the various steps of the method of selecting a group and the method of evaluating a metric in accordance with the invention are determined by computer program instructions.

Consequently, the invention also provides a computer program on a data medium, the program being suitable for being performed in a central unit, or more generally in a computer, the program including instructions adapted to performing steps of a group selection method as described above. The invention also provides a computer program on a data medium, the program being suitable for being performed in a receiver, or more generally in a computer, the program including instructions adapted to performing steps of a metric evaluation method as described above.

These programs may use any programming language, and be in the form of source codes, object codes, or codes intermediate between source codes and object codes, such as in a partially compiled form, or in any other desirable form.

The invention also provides a computer readable data medium including instructions of a computer program as mentioned above.

The data medium may be any entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

The data medium may also be a transmissible medium such as an electrical or optical signal suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In a fourth aspect, the invention provides a transmitter of a communications network, the transmitter forming a transmitter-receiver pair with a receiver of the network, the pair belonging to a group having a predetermined number NG of transmitter-receiver pairs, the transmitter comprising:

means for executing an iterative interference alignment technique during a predetermined number I1 of iterations on signals transmitted by the group; and means for sending a pilot signal that is precoded with the help of a matrix resulting from executing the iterative interference alignment technique.

The invention also provides a communications network system comprising:

a plurality of transmitter-receiver pairs, each formed by a transmitter in accordance with the invention and a receiver in accordance with the invention; and a central unit in accordance with the invention and suitable for selecting from said plurality of transmitter-receiver pairs a group having a predetermined number NG of transmitter-receiver pairs for communicating over the communications network.

The transmitter and the communications system of the invention have the same advantages as the grouping method of the invention.

In other embodiments and implementations, it is also possible to envisage that the grouping method, the selection method, the evaluation method, the central unit, the receiver, the transmitter, and the communications system of the invention present in combination all or some of the above-specified characteristics.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 2:
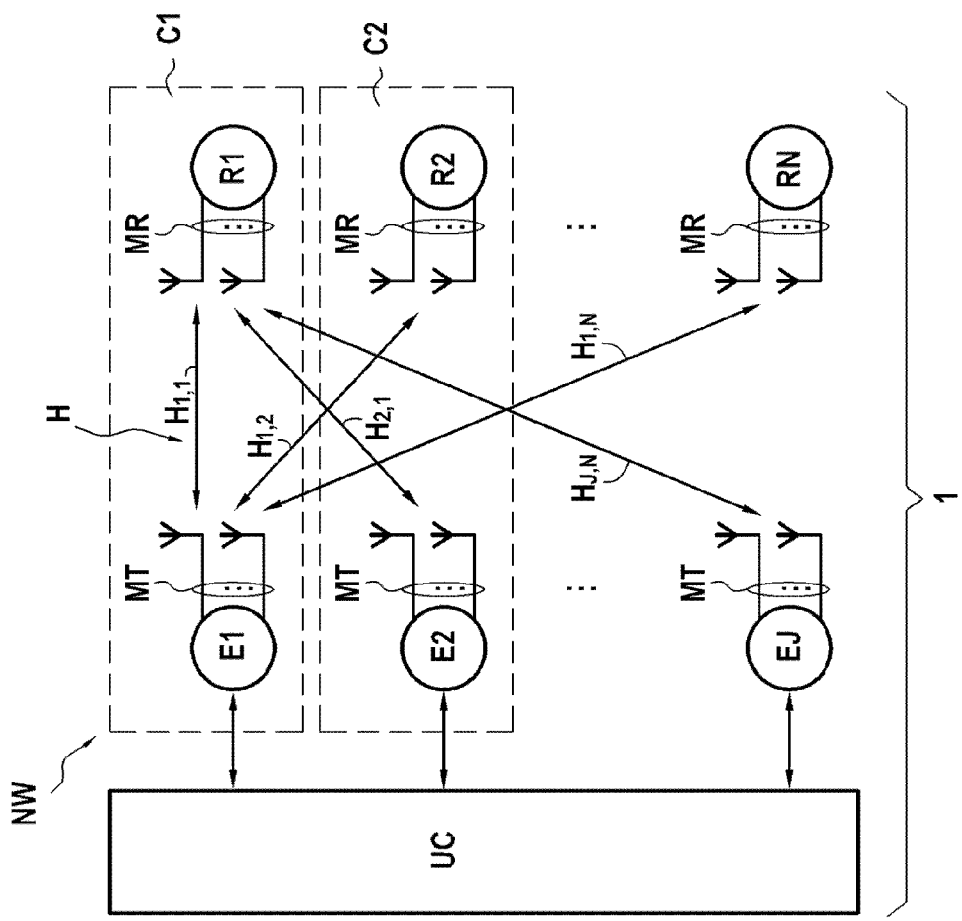
FIG. 2 shows a system of the invention in a particular embodiment.
Figure 1:
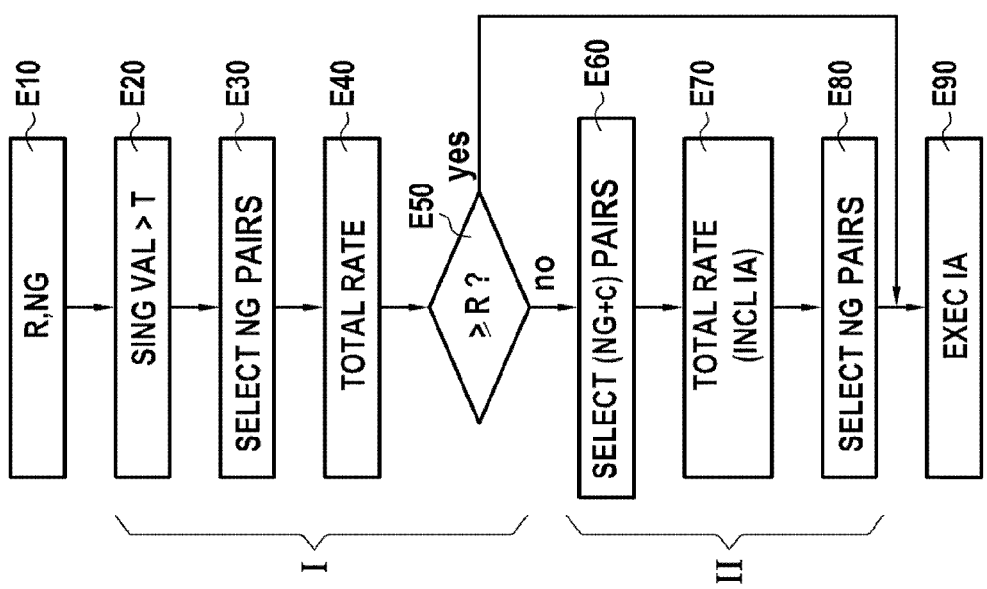
FIG. 1, described above, is a diagram showing a prior art grouping method.

FIG. 2 shows a communications network NW system 1 in accordance with a particular embodiment of the invention in its environment.

In accordance with the invention, the system 1 comprises:

a plurality of transmitters E1, E2, . . . , EJ in accordance with the invention;

a plurality of receivers R1, R2, . . . , RN in accordance with the invention; and a central unit UC in accordance with the invention.

In this example, each transmitter is fitted with MT transmit antennas, where MT>1, and each receiver is fitted with MR receive antennas, where MR>1.

In the presently-described example, the network NW is a WiFi® network: the transmitters E1, E2, ..., EJ are access points to the network NW and the receivers R1, R2, ..., RN are terminals of users seeking to access the network NW.

Naturally, the invention applies in other contexts, and in particular to other communications networks and to other transmitter and/or receiver devices. Thus, by way of example, the invention also applies to a 3GPP network made up of a plurality of femtocells (transmitters in the meaning of the invention) in order to serve a plurality of user terminals (receivers in the meaning of the invention).

In this example it is assumed that during transmission over the communications network NW, each transmitter Ej is authorized to communicate with a single receiver Rn with which it forms a transmitter-receiver pair Cjn=(Ej,Rn). It is assumed that the procedures that enable the receiver to pair with the transmitter (e.g. the pairing procedure in a WiFi® network) have been successfully performed beforehand.

For simplification purposes, it is assumed below in the description that J=N and that each transmitter Ek, k=1, ..., N is coupled to the receiver Rk, k=1, ..., N, thereby forming a transmitter-receiver pair Ck=(Ek,Rk), k=1, ..., N. Furthermore, the description is limited to transmitting a single data stream per transmitter.

Nevertheless, these assumptions are not limiting, and the invention applies equally well to a different network configuration in which the number of transmitters J differs from the number of receivers N, and/or in which each transmitter can send a plurality of data streams simultaneously to each receiver. For example, the number of transmitters J may be smaller than the number of receivers N such that a transmitter may need to serve different receivers during distinct transmission periods.

During data transmission over the network NW, the transmitter-receiver pairs that communicate simultaneously over the network NW interfere with one another. In accordance with the invention, in order to mitigate this drawback, they implement an iterative interference alignment technique (or algorithm) referenced IA in order to eliminate such interferences.

As described above, interference alignment by using such techniques can be performed only for a limited number NG of transmitter-receiver pairs that are communicating simultaneously.

In the presently-described embodiment, the transmitters E1, E2, ..., EN are connected to the central unit UC that takes charge of selecting the group GOPT of NG transmitter-receiver pairs that are to be active simultaneously for the purposes of communicating over the network NW and of executing the interference alignment technique IA. The group GOPT is selected from a determined set Ω of groups of NG transmitter-receiver pairs. The other transmitter-receiver pairs of the network NW remain inactive (i.e. silent) during the time the transmitter-receiver pairs of the group GOPT are transmitting.

The transmitters Ek, k=1, ..., N, the receivers Rk, k=1, ..., N, and the central unit UC in this example all have the hardware architecture of a computer.

Figure 3A:
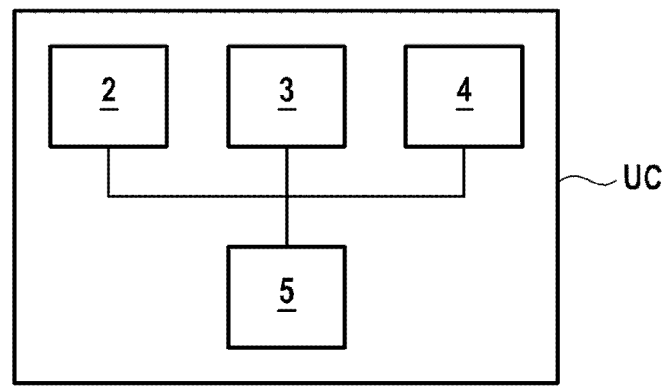
FIGS. 3A, 3B, and 3C show respectively the hardware architectures of a central unit, of a receiver, and of a transmitter in accordance with the invention and in particular embodiments.

Thus, with reference to FIG. 3A, the central unit UC comprises in particular a processor 2, a random access memory (RAM) 3, a ROM 4, and communications means 5 for communicating over the network NW, in particular with the transmitters Ek, k=1, ..., N and with the receivers Rk, k=1, ..., N.

Figure 5:
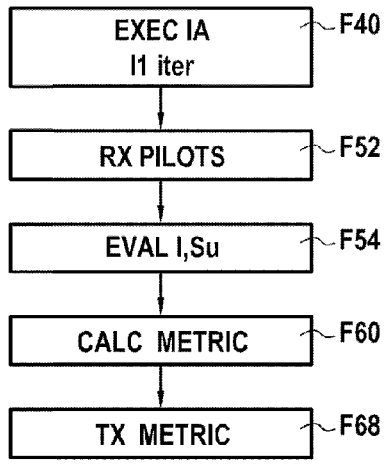
FIG. 5 is a flow chart showing the main steps of a selection method in accordance with the invention when it is performed by the central unit shown in FIG. 2, in a particular implementation.

The ROM 4 of the central unit constitutes a storage medium in accordance with the invention that is readable by the processor 2 and that stores a computer program in accordance with the invention, including instructions for executing steps of a group selection method in accordance with the invention as described below with reference to FIG. 5, for a particular variant implementation.

Figure 3B:
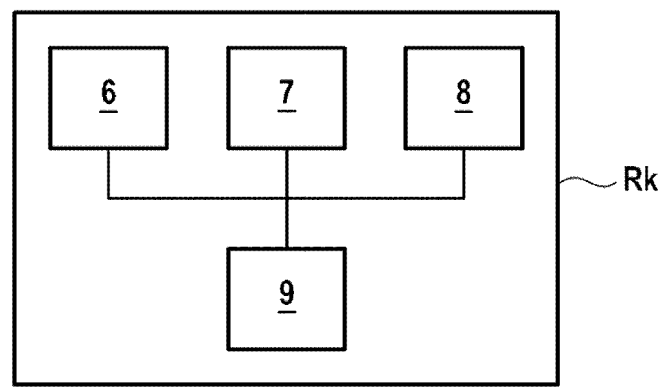

In similar manner, with reference to FIG. 3B, each receiver Rk, k=1, ..., N comprises a processor 6, a RAM 7, a ROM 8, and communications means 9 for communicating over the network NW, and in particular with the transmitter Ek with which it forms the pair Ck=(Ek,Rk). These communications means 9 include in particular the MR receive antennas of the receiver Rk.

Figure 6:
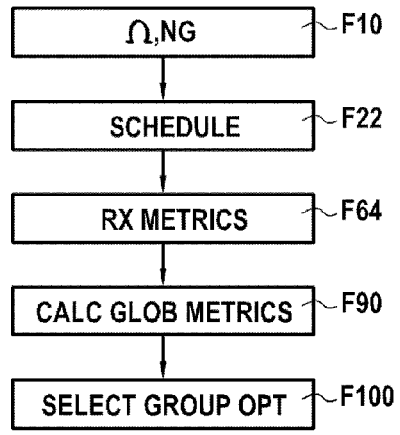
FIGS. 6 and 7 are flow charts showing the main steps of a method of evaluating a metric in accordance with the invention, when they are performed by the receivers shown in FIG. 2.

The ROM 8 of each receiver Rk constitutes a storage medium in accordance with the invention that is readable by the processor 6 and that stores a computer program in accordance with the invention including instructions for executing steps of a method of the invention for evaluating a metric, as described below with reference to FIGS. 6 and 7 in a particular variant implementation. The ROM 8 also constitutes a storage medium storing a program including instructions for executing the iterative interference alignment technique IA.

Figure 3C:
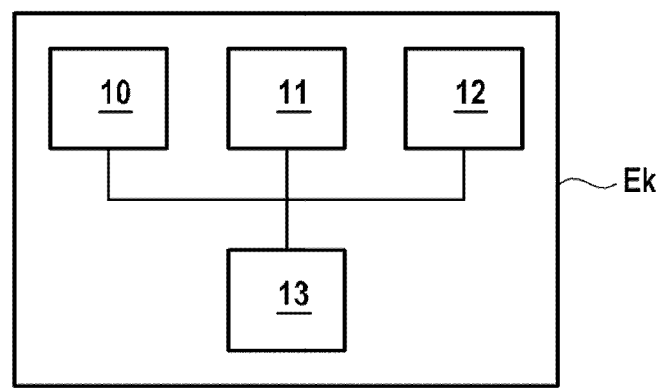
Figure 4:
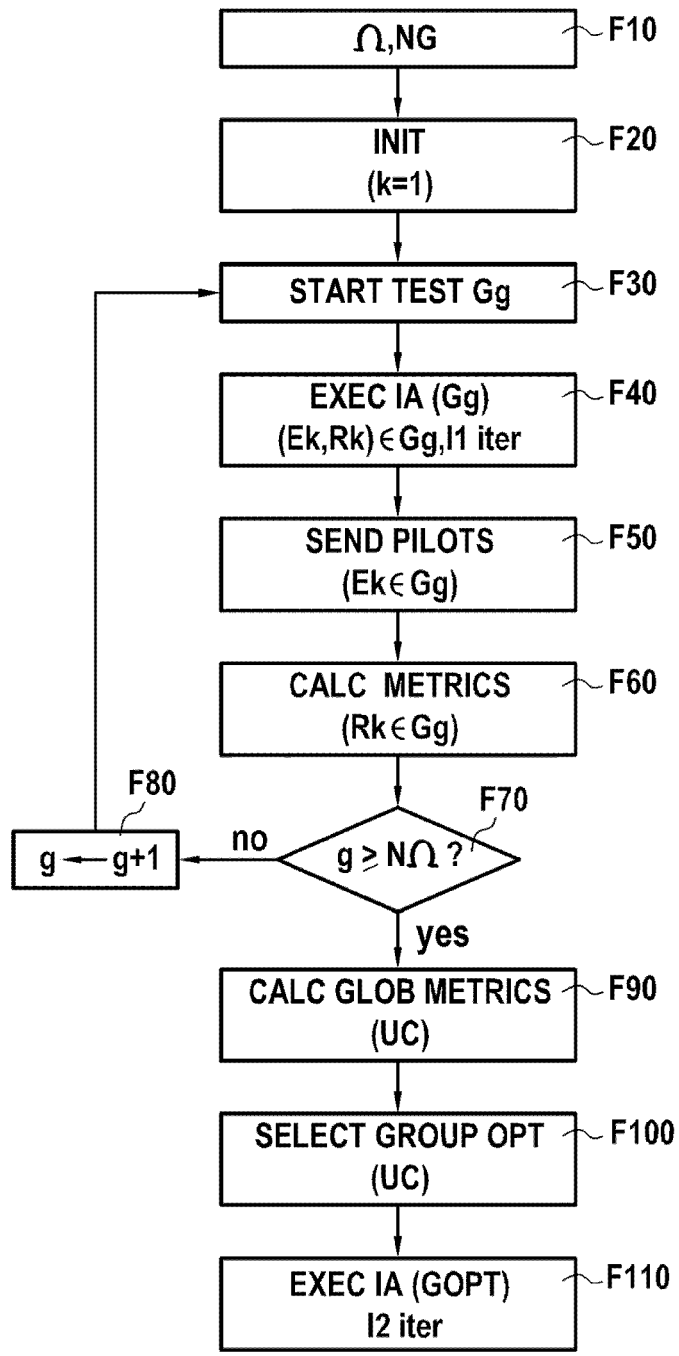
FIG. 4 is a flow chart showing the main steps of a grouping method in accordance with the invention when it is performed by the system shown in FIG. 2, in a particular implementation.

Furthermore, with reference to FIG. 3C, each transmitter Ek, k=1, ..., N comprises a processor 10, a RAM 11, a ROM 12, and communications means 13 for communicating over the network NW in particular with the central unit and with the receiver Rk with which it forms the pair Ck=(Ek, Rk). The communications means 13 incorporate in particular the MT transmit antennas of the transmitter Ek. The ROM 12 constitutes a storage medium storing a program including instructions for executing the iterative interference alignment technique IA.

As described above, interference alignment techniques seek to confine the interferences seen by a receiver Rk within a vector subspace of small dimension, by applying a precoding matrix to the signal transmitted by the transmitter Ek and by using the remaining dimensions for decoding the useful signal (i.e. the signal transmitted by the transmitter Ek), by using a processing matrix to project it onto a vector subspace that is orthogonal to the vector subspace associated with the interferences.

More precisely, for a transmitter-receiver pair Ck=(Ek, Rk) belonging to a group G selected by the central unit and applying the interference alignment technique IA, the complex signal $x_k \delta \mathbb{C}^{MT \times 1}$ (complex column vector of dimension MT) transmitted by the transmitter Ek via its MT transmit antennas is written:

$$x_k = v_k s_k$$

where $s_k$ designates a symbol of a data stream for the receiver Rk and $v_k$ is a precoding matrix of dimension MT×1 applied to the symbols of the receiver Rk ($v_k$ constitutes a precoding vector). It should be observed that the same principle applies to the other transmitter-receiver pairs Ck'=(Ek',Rk'), k'≠k of the group G.

The receiver Rk then receives the signal $y_k$ (here a column vector of dimension MR) on its MR receive antennas, the signal being defined as follows:

$$y_k = H_{k,k} v_k s_k + \underbrace{\sum_{\substack{k' \neq k \\ Ck' \in G}} H_{k',k} v_{k'} s_{k'}}_{I_k} + n_k$$

where $H_{k',k} \in \mathbb{C}^{MR \times MT}$ is a complex matrix of dimensions MR×MT representing the propagation channel between the transmitter Ek' and the receiver Rk, and $n_k$ is Gaussian additive white noise. The term $I_k$ represents the multiuser interference affecting the useful signal $H_{k,k}v_k s_k$ at the receiver Rk. In other words, the vector subspace generated by the useful signal is defined by the matrix $H_{k,k}V_k$ while the vector subspace generated by the interferences is defined by the matrix $$\bigcup_{\substack{k' \neq k \\ C k' \in G}} H_{k',k} v_{k'}.$$

The receiver Rk applies a processing matrix $u_k \in \mathbb{C}^{1 \times MR}$ (i.e. in this example a processing vector of dimensions MR) to the received signal $y_k$ in order to recover the symbols $s_k$ that are being sent to it. This processing matrix projects the useful signal onto a vector subspace orthogonal to the subspace generated by the interferences.

In the presently-described example, it should be observed that since the transmitter Ek sends only one data stream to the receiver Rk (i.e. d=1), it applies a precoding vector $v_k$ to the data transmitted to the receiver Rk, and in similar manner, the receiver Rk applies a processing vector $u_k$ to the received signal. The precoding vector $v_k$ constitutes a particular precoding matrix in the meaning of the invention, having dimensions MT×1. Likewise the processing vector $u_k$ constitutes a particular processing matrix of dimensions 1×MR.

Transposition to precoding matrices of dimensions MT×d and to processing matrices of dimensions d×MR, where d designates the number of data streams transmitted by the transmitter Ek to a receiver Rk, does not present any difficulty for the person skilled in the art and is therefore not described in detail herein. In the description below, the terms "vector" and "matrix" are used interchangeably to designate $u_k$ and $v_k$.

The invention is not limited to any particular iterative interference alignment technique. Examples of iterative interference alignment techniques that can be used when performing the invention are described in particular in the document by Kumar and Xue entitled "An iterative algorithm for joint signal and interference alignment", International Symposium on Information Theory (ISIT), June 2010, and in the document by Gomodam et al. entitled "Approaching the capacity of wireless networks through distributed interference alignment", IEEE Global Telecommunications Conference GLOBECOM, December 2008. With reference to FIGS. 4 to 7, there follows a description of the main steps of a grouping method, a method of selecting a group, and a method of evaluating a metric as performed respectively by the communications system 1, by the central unit UC, and by the receivers Rk, k=1, . . . , N of FIG. 2, in a particular implementation.

As mentioned above, interference alignment is possible only for a limited number NG of transmitter-receiver pairs communicating simultaneously over the network NW. The document by F. Negro et al. entitled "Interference alignment limits for K-user frequency flat MIMO interference channel", European Signal Processing Conference (Eusipco), August 2009, identifies a set of conditions that need to be satisfied to make interference alignment possible in a MIMO system.

Applying those conditions makes it possible to evaluate a maximum number NGmax of transmitter-receiver pairs for which alignment is possible. Thus, by way of example, for a symmetric MIMO system, in which each transmitter seeks to transmit a single data stream and is provided with MT transmit antennas, and each receiver is provided with MR receive antennas, NGmax=MT+MR−1.

In order to maximize the total spectrum efficiency of the system, it is therefore preferable to seek to select a group GOPT made up of NG=NGmax transmitter-receiver pairs. Nevertheless, the invention may equally well be applied to selecting a group made up of any number NG of transmitter-receiver pairs that is less than NGmax.

Once the number NG is set, in the embodiment shown in FIG. 2, there exist $C_N^{NG}$ combinations (i.e. groups) of NG pairs from among the N transmitter-receiver pairs of the network NW. The set formed by the $C_N^{NG}$ groups is written $\Omega$ and the cardinality of the set $\Omega$ is written $N\Omega = C_N^{NG}$.

By way of example, if a system is considered that is made up of N=6 transmitter-receiver pairs, with each transmitter having MT=2 transmit antennas and each receiver having MR=2 receive antennas, interference alignment can be achieved over NG=NGmax=3 pairs. The set $\Omega$ of groups of the system formed by three pairs comprises 20 groups corresponding to the 20 possible combinations of three transmitter-receiver pairs selected from the six transmitter-receiver pairs of the network NW.

In similar manner, if consideration is given to a system made up of N=6 transmitter-receiver pairs, each transmitter having MT=4 transmit antennas and each receiver having MR=2 receive antennas, interference alignment can be achieved over NG=NGmax=5 pairs. The set $\Omega$ of groups of the system made up of five pairs comprises six groups corresponding to the six possible combinations of five transmitter-receiver pairs selected from the six transmitter-receiver pairs of the network NW.

In another embodiment, the number J of transmitters is different from the number N of receivers (e.g. J<N). For example, consideration is given to a system made up of J=3 transmitters and N=6 receivers, two receivers being allocated to a single transmitter. During each transmission period, each transmitter serves only one receiver from the two receivers allocated thereto. In this configuration, the central unit UC has the option of selecting eight possible group configurations comprising three transmitter-receiver pairs.

In the presently-described example, the number NG and the set $\Omega$ are determined by the central unit UC (step F10) in the manner described above. Nevertheless, these parameters may be defined by other entities of the network NW and transmitted using conventional means to the central unit UC.

The grouping method is then performed by the various actors in the system 1 in order to identify one group GOPT from the determined set $\Omega$ of groups of NG pairs, which identified group is to be authorized to communicate over the network NW during a transmission period.

While this method is being performed, and in the presently-described implementation, all of the groups of the set $\Omega$ are tested in order to enable the central unit UC to select the group that optimizes a predetermined criterion. The period needed for performing these tests and for taking a decision is referred to as the decision period. It has a duration $T_{decision}$.

The steps described below are repeated for each group Gg of the set $\Omega$. The index of the group Gg of the set $\Omega$ under test is written g, g=1, . . . , N$\Omega$, and g is initialized to 1 (step F20).

The order in which the groups are tested is decided by the central unit UC (step F22). This order determines the distribution of the communication times allocated to each group on the network NW during the decision period. The distribution of communication times is described below with reference to FIG. 8.

The central unit UC selects the group Gg and starts a stage of testing this group (step F30). While a group Gg is under test, the other groups of transmitter-receiver pairs in the set Ω remain silent or inactive, i.e. they do not communicate over the network NW. This may result from the central unit UC sending an appropriate command to the other group of the set Ω that are not under test.

In accordance with the invention, during this test stage, the NG pairs of the group Gg execute the iterative interference alignment technique IA for a predetermined number of iterations I1 (step F40). This technique is applied to the signals transmitted by the NG pairs of the group Gg (signals transmitted by the group Gg in the meaning of the invention), in conventional manner.

Thus, reusing the notation specified above, each transmitter Ek, k=1, . . . , NG of the group Gg sends a signal (e.g. a predefined pilot signal) that is precoded with the help of a precoding matrix $v_k$ of dimensions MT×1, and each receiver applies a processing matrix $u_k$ of dimensions 1×MR to the received signal, where the matrices $v_k$ and $u_k$ are defined respectively in such a manner as to confine the interferences received at the receiver Rk in a vector subspace of small dimension and to project the useful signal transmitted by the transmitter onto a subspace that is orthogonal to the interference vector subspace. The way in which the matrices $u_k$ and $v_k$ are actually determined depends on the iterative interference alignment technique implemented and is not described in greater detail herein. The matrices $v_k$ and $u_k$ are updated on each iteration of the technique IA.

The number I1 of iterations during which the technique IA is executed by the pairs of the group Gg is preferably selected to be much less than the number I2 of iterations needed for ensuring that the technique IA converges. This makes it possible, advantageously, to limit the complexity of the test stage. Furthermore, the inventors have found that in practice, a few iterations suffice to estimate approximately the directions of the interferences and the direction of the useful signal (possibly even a single iteration), e.g. I1=10 for I2=200.

Nevertheless, this example is given merely by way of illustration and the selected number I1 of iterations (I1 greater or equal to 1) is the result of a performance/complexity compromise that it is desired to achieve.

In accordance with the invention, after the technique IA has been executed by the pairs of the group Gg for a number I1 of iterations, each transmitter Ek, k=1, . . . , Ng of the group Gg then transmits a predetermined pilot signal written $SP_k$ that is made up of a plurality of symbols and precoded using the precoding matrix $v_k$ as obtained by the transmitter Ek at the end of the 11 iterations (step F50). The transmitters transmit the precoded pilot signals $v_k SP_k$, k=1, . . . , NG at successive instants during a predetermined duration written Tp (each signal is transmitted for a duration Tp).

When a transmitter Ek of the tested group Gg transmits a precoded pilot signal $v_k SP_k$, the other transmitters of the group Gg (and the other groups of the set Ω) remain silent in accordance with the invention, i.e. they do not communicate over the network NW. As a result, the receivers of the group Gg are capable of estimating the directions of the interferences coming from each of the transmitters in the group Gg.

During the period Tp, the only signal received by the receivers of the group Gg under test is the precoded pilot signal $v_k SP_k$ transmitter and precoded by the transmitter Ek then authorized to communicate over the network NW (step S52). Each receiver Rk', k'=1, . . . , NG can thus use the received signal $H_{k,k'} v_k SP_k$ to estimate the direction of the useful signal for that receiver, if the receiver is the receiver Rk paired with the transmitter Ek (i.e. k'=k), or else the direction of the interference generated by the transmitter Ek if the receiver is a receiver Rk' that is not paired with the transmitter Ek (i.e. k'≠k) (step F54).

Each receiver Rk, k=1, . . . , N then evaluates a metric dIA(k) from the pilot signals received from the various transmitters of the group (step F60). In the presently-described example, this metric characterizes the distance between a vector subspace defined by the matrix $SU_k = H_{k,k} v_k$ and generated by the useful signal for the receiver Rk under consideration (in other words by the signal $v_k SP_k$), and a vector subspace defined by the matrix $A_k$ generated by the interferences affecting the useful signal (in other words by the precoded pilot signals sent by the transmitters other than Ek). In the presently-described implementation, the subspace $A_k$ generated by the interferences that are taken into consideration is the subspace generated by the MR-1 strongest interferences as estimated by the receiver.

Figure 7:
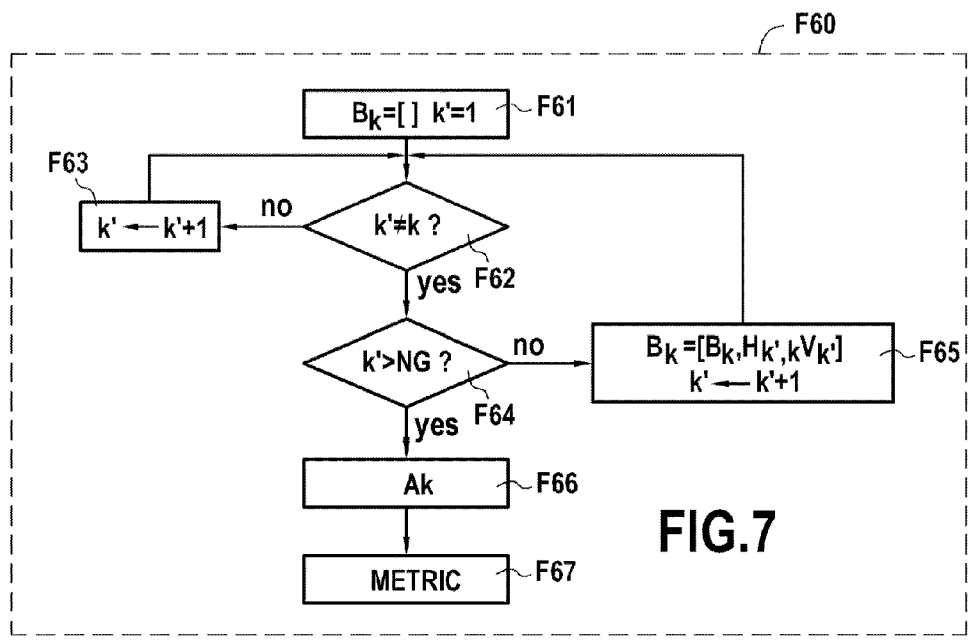

FIG. 7 shows the steps performed by the receiver Rk to evaluate the metric dIA(k). The matrix defining the vector subspace generated by all of the interferences affecting the useful signal at the receiver Rk is written $B_k$.

As described above, the metric dIA(k) is evaluated by taking account of the various precoded pilot signals received from the transmitters Ek', k'=1, . . . , NG.

For this purpose, and more precisely, the receiver Rk initializes a count k' to 1 and the matrix $B_k$ to an empty matrix (step F61). The steps described below are repeated for each value of the count k' in the range 1 to NG.

If k'=k (response no to test F62), the pilot signal received from the transmitter Ek'=Ek by the receiver Rk corresponds to a useful signal and it is therefore not taken into account when estimating the matrix $B_k$. The count k' is merely incremented (step F63).

Otherwise, if k'≠k (response yes to test F62) and k'≤NG (response no to test F64), then the precoded pilot signal received from the transmitter Ek' corresponds to an interference signal that has not yet been taken into account while estimating the matrix $B_k$. The matrix $B_k$ is then updated as follows (step F65):

$$B_k \leftarrow [B_k, H_{k',k} v_{k'}]$$

The count k' is incremented by 1.

The steps F62-F65 are then repeated for this new value of k'.

If the receiver Rk determines that the count k'>NG (response yes to test F64), it then extracts from the current matrix $B_k$ the MR-1 strongest interferences to form the matrix $A_k$; in other words, the matrix $A_k$ is constituted by the MR-1 columns of the matrix $B_k$ having the greatest norms (step F66). By way of example, the norm $l_2$ that is known to the person skilled in the art is applied. This norm is defined for a vector as the sum of the norms squared of the components of the vector. Naturally, other norms would be envisaged (e.g. the maximum norm of a component of the vector, etc.).

In the presently-described implementation, the receiver Rk evaluates the metric dIA(k) by calculating the distance between the vector subspace defined by the matrix $SU_k$ and the vector subspace defined by the matrix $A_k$ (step F67).

For this purpose, it uses the chord distance defined as follows:

$$d_{chord}(M1, M2) = \frac{1}{\sqrt{2}} \|O(M1)O(M1)^H - O(M2)O(M2)^H\|_F$$

where O(M) designates a matrix in which the columns form an orthonormal base of the vector space generated by the columns of the matrix M, and $\| \|_F$ designate the Frobenius norm which is given by $\|M\|_F = \sqrt{tr(MM^H)}$.

The metric dIA(k) calculated by the receiver Rk is thus:

$$dIA(k) = d_{chord}(SU_k, A_k)$$

Distances between two vector subspaces other than the chord distance may be envisaged as a variant. Such distances are described for example in the document by Zuccon et al. entitled "Semantic spaces: measuring the distance between different subspaces", Proceedings of the 3rd International Symposium on Quantum Interaction, 2009.

In the presently-described implementation, each receiver Rk then transmits the metric dIA(k) as evaluated in this way to the transmitter Ek (step F68) which in turn transmits it to the central unit UC.

In a variant, in another implementation, each receiver Rk transmits the metric dIA(k) that it has evaluated directly to the central unit UC.

Reception by the central unit UC of the metric dIA(k) as evaluated by all the receivers Rk, k=1, . . . , NG of the group Gg closes the test stage for the group Gg.

The central unit then determines whether the index g is greater than or equal to NΩ (step F70).

If g<NΩ (response no to test F70), then the index g is incremented (step F80) and the test stage is performed for a new group Gg of the determined set Ω.

In contrast, if g≥NΩ (response yes to test F70), that means that all of the groups of the set Ω have been tested.

In the presently-described implementation, all of the groups of set Ω are tested exhaustively. In a variant, only a subset of the set Ω need be tested, which subset is preselected using certain predetermined criteria (e.g. subgroups involving only certain transmitters and/or certain receivers, etc.).

For each group Gg tested in the set of groups Ω, the central unit UC then calculates a global metric associated with the group (step F90). This global metric is written Met(Gg) and in this example it is equal to the sum of the metrics obtained for each receiver of the group, in other words the global metric associated with the group Gg is given by:

$$Met(Gg) = \sum_{\substack{k=1 \\ Rk \in Gg}}^{NG} dIA(k)$$

Naturally, other global metrics may be defined using the metrics dIA(k) in order to calculate the global metric that is associated with each group when performing the invention.

In another implementation, the central unit UC calculates the global metric Met(Gg) associated with the group Gg during the stage of testing the group Gg.

Thereafter, the central unit UC selects from the determined set Ω the group GOPT that optimizes the global metric, i.e. the group for which the global metric is a maximum (step F100). In a variant, other criteria may be envisaged, in particular as a function of how the global metrics taken into consideration are defined.

After this selection, the group GOPT communicates during a determined transmission period over the network NW and executes the iterative interference alignment technique IA on the signals transmitted by the group GOPT for I2 iterations during this communication (step F110). Only the transmitter-receiver pairs of the group GOPT are active during this communication, with the other transmitter-receiver pairs not being authorized to communicate and remaining silent. The number I2 is selected so as to ensure that the interference alignment technique converges.

Figure 8:
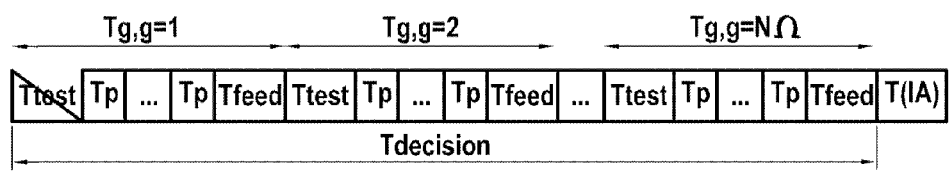
FIG. 8 is a diagram showing the distribution of communication times between the various actors in the system shown in FIG. 2.

FIG. 8 shows an example of communication time distribution among the various actors of the system 1 while performing the grouping method of the invention, in a particular implementation. This distribution may be organized for example by the central unit UC with the help of appropriate commands that are sent to the various transmitters and/or receivers concerned. In a variant, it may be predefined and known to the various transmitters/receivers concerned.

In the presently-described implementation, the execution of the grouping method is subdivided into two periods:
 a first period of duration $T_{decision}$ during which the various groups of the set Ω are tested and the central unit selects the group GOPT that is to be active on the communications network NW; and
 a second period of duration T(IA) during which the pairs of the selected group GOPT are active (i.e. communicate) over the communications network NW while executing the iterative interference alignment technique IA for I2 iterations.

The period $T_{decision}$ is itself subdivided into NΩ intervals each of duration $T_G$. During each interval of duration $T_G$, one group Gg of transmitter-receiver pairs of the set Ω is tested.

Each interval of duration $T_G$ is made up as follows:
 a first period of duration $T_{test}$ during which the iterative interference alignment algorithm IA is executed by the group under test using a number I1 of iterations;
 a second period of duration NG×Tp during which each transmitter of the NG pairs of the group under test sends in succession (i.e. each sends in turn) a pilot signal precoded by the precoding matrix resulting from that transmitter executing the algorithm IA; and
 a third period $T_{feed}$ during which the receivers of the NG pairs in the group under test inform the transmitters of the values of the metrics that they have calculated.

Figure 9:
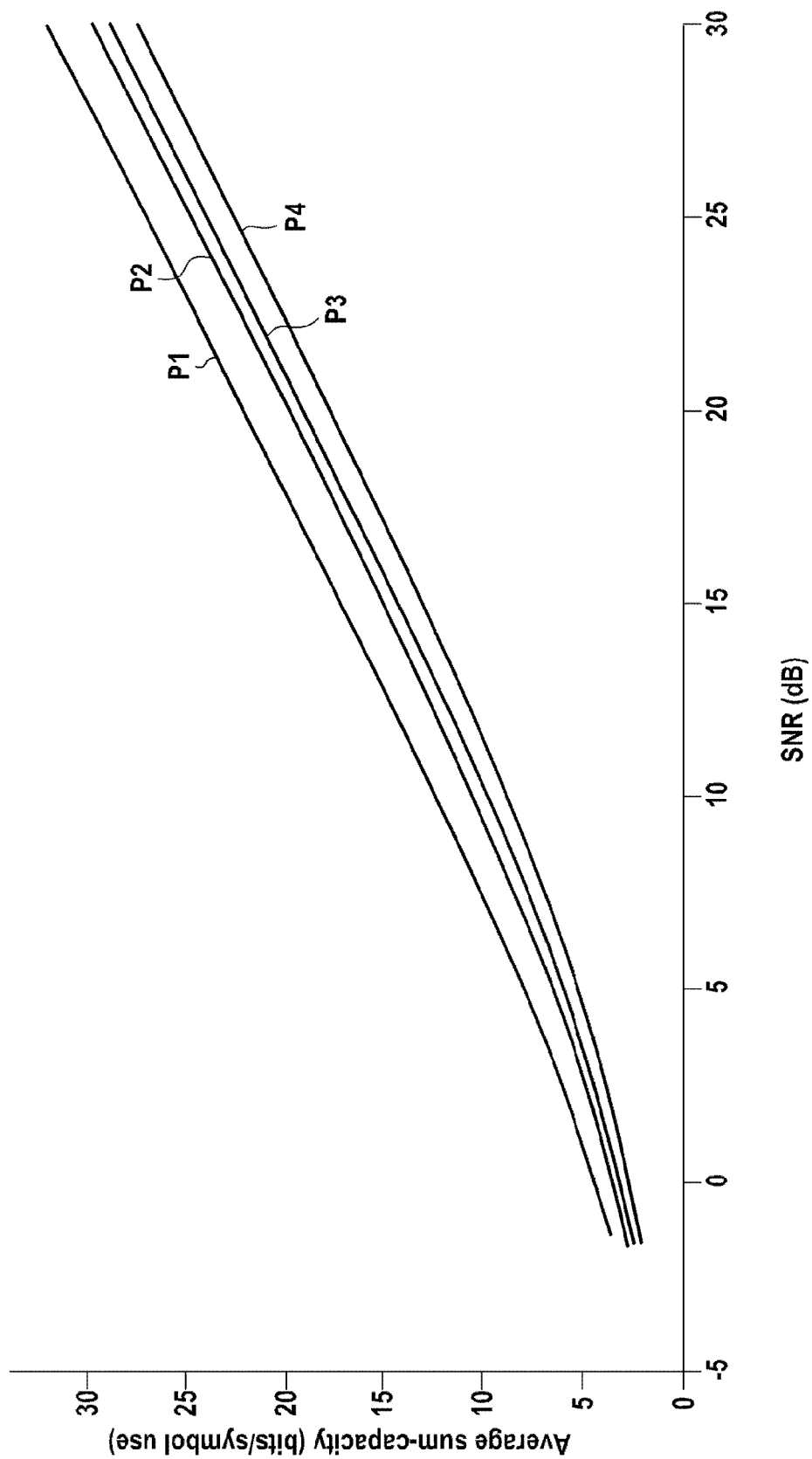
FIG. 9 shows examples of the performance that can be achieved with the help of the grouping method of the invention.

FIG. 9 shows an example of performance in terms of average sum capacity versus signal-to-noise ratio (SNR) as obtained with the help of a grouping method of the invention, for I1=1 iteration (curve P2) and I1=10 iterations (curve P3), when this method is applied to a system comprising six transmitter-receiver pairs with MT=MR=2 and d=1 data stream transmitted by each transmitter. The number of iterations executed by the group selected by the central unit for interference alignment is I2=200.

By way of indication, this figure also shows the performance obtained by using a random grouping method (curve P4) and the performance of an optimum grouping method (curve P1).

The invention claimed is:

1. A method of grouping a predetermined number NG of transmitter-receiver pairs for communicating over a communications network, said method comprising:
 for each group of a determined set of groups comprising NG transmitter-receiver pairs:
  an execution process in which the NG pairs of said group execute an iterative interference alignment technique for a predetermined number I1 of iterations on the signals transmitted by said group;

a sending process in which each transmitter of the NG pairs of said group sends a pilot signal precoded with the help of a matrix resulting from executing said iterative interference alignment technique, the transmitters of the NG pairs of said group successively transmitting the pilot signals; and an evaluation process in which each receiver of the NG pairs of said group evaluate a metric representative of a distance between a vector subspace generated by the precoded pilot signal transmitted by the transmitter with which the receiver forms a transmitter-receiver pair and a vector subspace generated by the interferences affecting the pilot signal as determined from the precoded pilot signals transmitted by the other transmitters of the group;

a calculation process in which a central unit of the network calculates a global metric associated with each group of the determined set of groups on the basis of the metrics evaluated by the receivers of the NG pairs of the group; and a selection process in which the central unit selects from the determined set of groups a group that optimizes the global metric for communicating over the network.

2. A grouping method according to claim 1, wherein after the selection process, the pairs of the group selected for communicating over the communications network execute said iterative interference alignment technique on the signals transmitted by said selected group for a number I2 of iterations that is greater than the number I1.

3. A selection method in which a central unit of a communications network selects a group having a predetermined number NG of transmitter-receiver pairs for communicating over said network, said method comprising:

for each group of a determined set of groups comprising NG transmitter-receiver pairs, an obtaining process of obtaining metrics evaluated by the receivers of the NG pairs of said group after execution of an interference alignment technique by said group during a predetermined number I1 of iterations on signals transmitted by the group, and after receiving pilot signals transmitted successively by the transmitters of the NG pairs of said group, the pilot signals being precoded with the help of matrices resulting from executing the iterative interference alignment technique, each metric evaluated by a receiver of said group being representative of a distance between a vector subspace generated by the precoded pilot signal transmitted by the transmitter with which the receiver forms a transmitter-receiver pair, and a vector subspace generated by interferences affecting this precoded pilot signal as determined from the precoded pilot signals transmitted by the other transmitters of the group;

a calculation process of calculating a global metric associated with each group of said determined set of groups on the basis of the metrics evaluated by the receivers of the NG pairs of the group; and a selection process of selecting from the determined set of groups a group that optimizes the global metric for communicating over the network.

4. A selection method according to claim 3, wherein the global metric associated with a group is equal to the sum of the metrics evaluated by the receivers of the NG pairs of the group.

5. A non-transitory computer readable medium having stored thereon a computer program including instructions for executing the selection method according to claim 3 when said program is executed by a computer.

6. An evaluation method for evaluating a metric by a receiver of a communications network, said receiver forming a transmitter-receiver pair with a transmitter of the network, the pair belonging to a group having a predetermined number NG of transmitter-receiver pairs, said evaluation method comprising:

an execution process of executing an iterative interference alignment technique during a predetermined number I1 of iterations on signals transmitted by said group;

a reception process of receiving pilot signals transmitted successively by the transmitters of the NG pairs of said group, which pilot signals are precoded with the help of matrices resulting from executing the iterative interference alignment technique; and an evaluation process of evaluating a metric representative of a distance between a vector subspace generated by the precoded pilot signal transmitted by the transmitter with which the receiver forms a transmitter-receiver pair, and a vector subspace generated by interferences affecting this precoded pilot signal and determined from the precoded pilot signals transmitted by the other transmitters of the group.

7. A method of evaluating a metric according to claim 6, the method further comprising a transmission step process of transmitting said metric to a transmitter with which said receiver forms said pair or to a central unit of the communications network.

8. A method of evaluating a metric according to claim 6, wherein the evaluated metric is representative of a chord distance between said vector subspaces.

9. A method of evaluating a metric according to claim 6, wherein the receiver is provided with MR receive antennas, and wherein the subspace generated by the interferences taken into consideration for evaluating the metric is the vector subspace generated by the MR-1 strongest interferences.

10. A non-transitory computer readable medium having stored thereon a computer program including instructions for executing the selection method of claim 6 when said program is executed by a computer.

11. A central unit of a communications network suitable for selecting a group for communicating over said network, said group comprising a predetermined number NG of transmitter-receiver pairs, and said central unit comprising:

a processor configured to obtain metrics for each group of a determined set of groups, each comprising NG transmitter-receiver pairs, the metrics being evaluated by the receivers of the NG pairs of said group after said group has executed an interference alignment technique for a predetermined number I1 of iterations on signals transmitted by the group and after receiving pilot signals transmitted successively by the transmitters of the NG pairs of said group, the pilot signals being precoded with the help of matrices resulting from executing the iterative interference alignment technique, each metric evaluated by a receiver of said group being representative of a distance between a vector subspace generated by the precoded pilot signal transmitted by the transmitter with which the receiver forms a transmitter-receiver pair, and a vector subspace generated by interferences affecting the precoded pilot signal and determined from precoded pilot signals transmitted by the other transmitters of the group;

a processor configured to calculate a global metric associated with each group of the determined set of groups on the basis of the metrics evaluated by the receivers of the NG pairs of the group; and a processor configured to select from the determined set of groups a group that optimizes the global metric for communicating over the network.

12. A receiver of a communications network, said receiver forming a transmitter-receiver pair with a transmitter of the network, the pair belonging to a group having NG transmitter-receiver pairs, said receiver comprising:

a processor configured to execute an iterative interference alignment technique during a predetermined number I1 of iterations on signals transmitted by said group;

wherein said receiver is configured to receive pilot signals transmitted successively by the transmitters of the NG pairs of said group and precoded with the help of matrices resulting from executing the iterative interference alignment technique; and wherein said receiver comprises a processor configured to evaluate a metric representative of a distance between a vector subspace generated by the precoded pilot signal transmitted by the transmitter with which the receiver forms a transmitter-receiver pair, and a vector subspace generated by interferences affecting this precoded pilot signal as determined from precoded pilot signals transmitted by the other transmitters of the group.

13. A communications network system comprising:

a plurality of transmitter-receiver pairs, each formed by a transmitter and a receiver; and a central unit suitable for selecting from said plurality of transmitter-receiver pairs a group having a predetermined number NG of transmitter-receiver pairs for communicating over the communications network;

wherein said transmitter comprises a processor configured to execute an iterative interference alignment technique during a predetermined number I1 of iterations on signals transmitted by said group and wherein said transmitter is configured to send a pilot signal that is precoded with the help of a matrix resulting from executing the iterative interference alignment technique;

wherein said receiver a comprises a processor configured to execute an iterative interference alignment technique during a predetermined number I1 of iterations on signals transmitted by said group, wherein said receiver is configured to receive pilot signals transmitted successively by the transmitters of the NG pairs of said group and precoded with the help of matrices resulting from executing the iterative interference alignment technique, and wherein said receiver comprises a processor configured to evaluate a metric representative of a distance between a vector subspace by the precoded pilot signal transmitted by the transmitter with which the receiver forms a transmitter-receiver pair, and a vector subspace generated by interferences affecting this precoded pilot signal as determined from precoded pilot signals transmitted by the other transmitters of the group; and wherein said central unit comprises:

a processor configured to obtain metrics for each group of a determined set of groups, each comprising NG transmitter-receiver pairs, the metrics being evaluated by the receivers of the NG pairs of said group after said group has executed an interference alignment technique for a predetermined number I1 of iterations on signals transmitted by the group and after receiving pilot signals transmitted successively by the transmitters of the NG pairs of said group, the pilot signals being precoded with the help of matrices resulting from executing the iterative interference alignment technique, each metric evaluated by a receiver of said group being representative of a distance between a vector subspace generated by the precoded pilot signal transmitted by the transmitter with which the receiver forms a transmitter-receiver pair, and a vector subspace generated by interferences affecting the precoded pilot signal and determined from precoded pilot signals transmitted by the other transmitters of the group;

a processor configured to calculate a global metric associated with each group of the determined set of groups on the basis of the metrics evaluated by the receivers of the NG pairs of the group; and a processor configured to select from the determined set of groups a group that optimizes the global metric for communicating over the network.

* * * * *